United States Patent [19]

Kartalopoulos

[11] Patent Number: 5,606,551
[45] Date of Patent: *Feb. 25, 1997

[54] BIDIRECTIONAL MESH NETWORK

[75] Inventor: Stamatios V. Kartalopoulos, Annandale, N.J.

[73] Assignee: Lucent Technologies Inc., Murray Hill, N.J.

[*] Notice: The term of this patent shall not extend beyond the expiration date of Pat. No. 5,602,838.

[21] Appl. No.: 360,517

[22] Filed: Dec. 21, 1994

[51] Int. Cl.$^6$ .............................. H04B 7/185; H04J 3/24
[52] U.S. Cl. ..................... 370/406; 370/229; 340/826; 340/825.05; 340/825.52; 342/352; 342/367; 342/368; 455/12.1
[58] Field of Search ................ 370/16, 16.1, 54, 370/60, 60.1, 85.12, 85.13, 85.14, 85.15, 94.1, 94.3; 340/825.03, 826, 827, 825.05, 825.5, 825.51, 825.52; 379/269, 271, 272, 273; 342/352, 361, 367, 368, 374

[56] References Cited

U.S. PATENT DOCUMENTS

| | | | |
|---|---|---|---|
| 4,598,400 | 7/1986 | Hillis | 370/60 |
| 4,736,465 | 4/1988 | Bobey et al. | 370/94.3 |
| 4,742,511 | 5/1988 | Johnson | 370/94.3 |
| 4,797,882 | 1/1989 | Maxemchuk | 370/60 |
| 5,105,424 | 4/1992 | Flaig et al. | 370/94.1 |
| 5,175,733 | 12/1992 | Nugent | 370/54 |

*Primary Examiner*—Alpus H. Hsu

[57] ABSTRACT

A communication network called a bidirectional mesh network (MSN), also called bi-MSN, is described. The bi-MSN includes a plurality of first communication loops (horizontal loops) each comprising a plurality of nodes interconnected to one another by bidirectional communication links. The bi-MSN also includes a plurality of second communication loops (vertical loops) each comprising a plurality of nodes interconnected to one another by bidirectional communication links. Each second communication loop is connected to each first communication loop at a node which is common to both the second communication loop and the first communication loop. This common node (and, in fact, each node in the bi-MSN) includes a switch to transfer packets from the first communication loop to the second communication loop, and vice versa, as a function of destination addresses contained in the packets.

17 Claims, 7 Drawing Sheets

BIDIRECTIONAL MESH NETWORK

CROSS-REFERENCE TO OTHER APPLICATIONS

The following application of common assignee contains some common disclosure, and is believed to have an effective filing date identical with that of the present application:

U.S. patent application entitled "A Global Multi-Satellite Network," by Stamatios V. Kartalopoulos, Attorney Docket No. S. V. Kartalopoulos 7 (1470.0710000), incorporated herein by reference in its entirety.

BACKGROUND OF THE INVENTION

1. Field of the Invention

The present invention relates generally to communication networks, and more particularly to communication networks having high channel/bandwidth capacity, high efficiency, fault tolerance, and network survivability.

2. Related Art

The ever-increasing demand in communication services has directed network technology into new network architectures and a mix of communication media not contemplated before. Broadband multi-media, including voice, interactive video, and personal communications services, using fiber, coaxial cable, and twisted pair, are currently being planned for implementation in the near future. The multi-billion dollar information highway contracts being award by a number of telephone companies is a testimony of this reality. However, such broadband multi-media represents real-time services that require communication networks having high channel/bandwidth capacity, high efficiency, fault tolerance, and network survivability.

Local area networks (LANs) are also affected by the movement towards multimedia. For performance reasons, the LANs which connect to broadband multi-media networks (i.e., communication networks which support broadband multi-media services) must be very high speed. Accordingly, the market is considering moving from the typical 10 Mbps (megabit per second) LAN to 100 Mbps (or higher) switched ATM (asynchronous transfer node) or equally fast Ethernet. See, for example, "What's the Successor to 10 Mbit/s Ethernet?", OEM Magazine, pp. 12–13, May 1994. To support multi-media services, however, it is not enough to simply increase the speed of LANs. Instead, LANs must be able to efficiently transport data in real-time, and must be characterized by communication network attributes such as intelligence and survivability.

THE MANHATTAN STREET NETWORK WITH LOOP ARCHITECTURE

The Manhattan Fiber Data Distributed Interface (also called the Manhattan Street Network (MSN) with Loop Architecture, or simply the Manhattan Network) is a network that has been considered for use with local area networks. The Manhattan Network is described in many publicly available documents, such as S. V. Kartalopoulos, "The Manhattan Fiber Data Distributed Interface Network Architecture", *Proceedings of the Globecom '90 Conference*, San Diego, Dec. 2–5, 1990, pp. 141–145; N. F. Maxemchuk, "Regular Mesh Topologies in Local and Metropolitan Area Networks", *AT&T Bell Laboratories Technical Journal*, Sep. 1985; and U.S. Pat. No. 5,289,467, all of which are herein incorporated by reference in their entireties.

FIG. 1 illustrates an example 4×4 (4 node by 4 node) Manhattan Network 102. This Manhattan Network 102 includes sixteen nodes 108, where each node 108 is individually identified by its (row, column).

The Manhattan Network 102 is a mesh network that includes a set of horizontal parallel loops 104 and a set of vertical parallel loops 106. The horizontal loops 104 intersect and connect to the vertical loops at the nodes 108. Each node 108 includes two input ports and two output ports. Each node 108 is capable of receiving data packets from any of its input ports and transmitting data packets via any of its output ports. Thus, each node 108 is capable of transporting data packets from a horizontal loop 104 to a vertical loop 106, and vice versa.

The Manhattan Network 102 has distributed control. Specifically, each node 108 in the Manhattan Network 102 makes autonomous decisions on how a packet should be routed (i.e., the routability of a packet). Hence, the Manhattan Network 102 is suitable for transporting a packet from a source node to a destination node via a number of potential different paths. Note, however, that all loops 104, 106 in the Manhattan Network 102 are unidirectional. That is, the data flow in the horizontal loops 104 is from West to East (or vise versa). The data flow in the vertical loops 106 is from North to South (or vice versa). (The North, South, East, and West directional conventions is used herein for illustrative purposes only.)

The Manhattan Network is most suitable in local area networks for high speed data transfers between two or more nodes where data deliverability is of greater importance than real-time transport. However, new broadband multi-media services demand voice and interactive video/data in addition to existing unidirectional data services. Effective voice and interactive video/data services require real-time data processing and extremely short propagation delays. Such services are called real-time communications (as opposed to store and forward communications). The Manhattan Network, because of its unidirectional characteristics, cannot always deliver a packet over the most efficient route. For example, if node (2,3) sends a packet to node (2,2), the packet must travel around the complete horizontal loop containing nodes (2,4) and (2,1) to reach node (2,2), even though nodes (2,2) and (2,3) are right next to each other.

Since the Manhattan Network cannot always deliver a packet over the most efficient route, real-time communication cannot be guaranteed when using the Manhattan Network. Consequently, the Manhattan Network cannot adequately support broadband multi-media services.

SUMMARY OF THE INVENTION

Briefly stated, the present invention is directed to a communication network called a bidirectional mesh network (MSN), also called bi-MSN. The bi-MSN includes a plurality of first communication loops (horizontal loops) each comprising a plurality of nodes interconnected to one another by bidirectional communication links. The bi-MSN also includes a plurality of second communication loops (vertical loops) each comprising a plurality of nodes interconnected to one another by bidirectional communication links.

Each second communication loop is connected to each first communication loop at a node which is common to both the second communication loop and the first communication loop. This common node (and, in fact, each node in the bi-MSN) includes a switch to transfer packets from the first communication loop to the second communication loop, and vice versa, as a function of destination addresses contained in the packets.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1. Overview of the Present Invention

The present invention is a bidirectional mesh network (MSN), also called bi-MSN. As described below, the bi-MSN of the present invention has high channel/bandwidth capacity, high efficiency, fault tolerance, and network survivability. Thus, the bi-MSN is capable of supporting broadband multi-media services (i.e., real-time communication).

Figure 1:
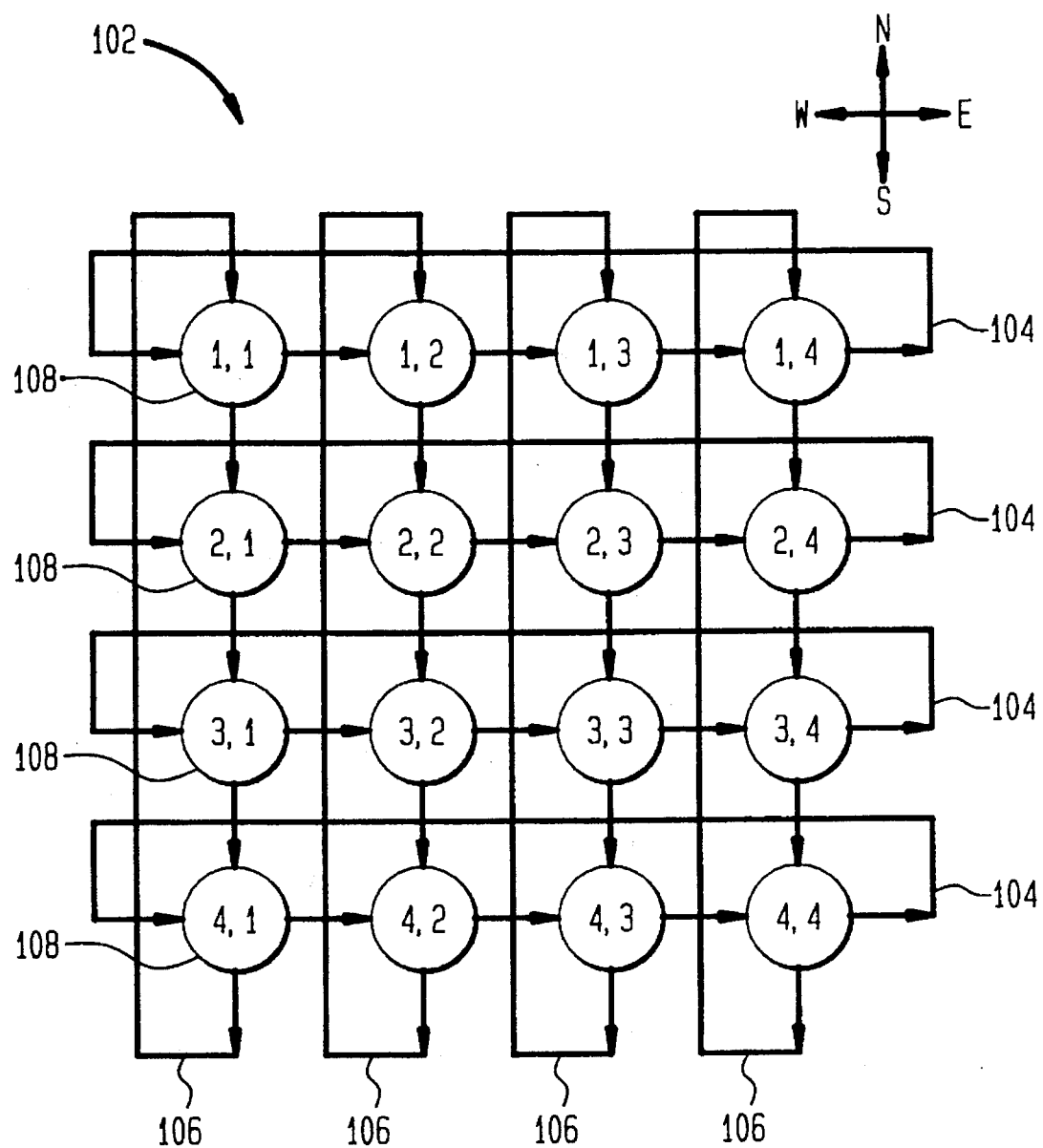
FIG. 1 illustrates a conventional Manhattan Street Network with Loop Architecture.
Figure 2:
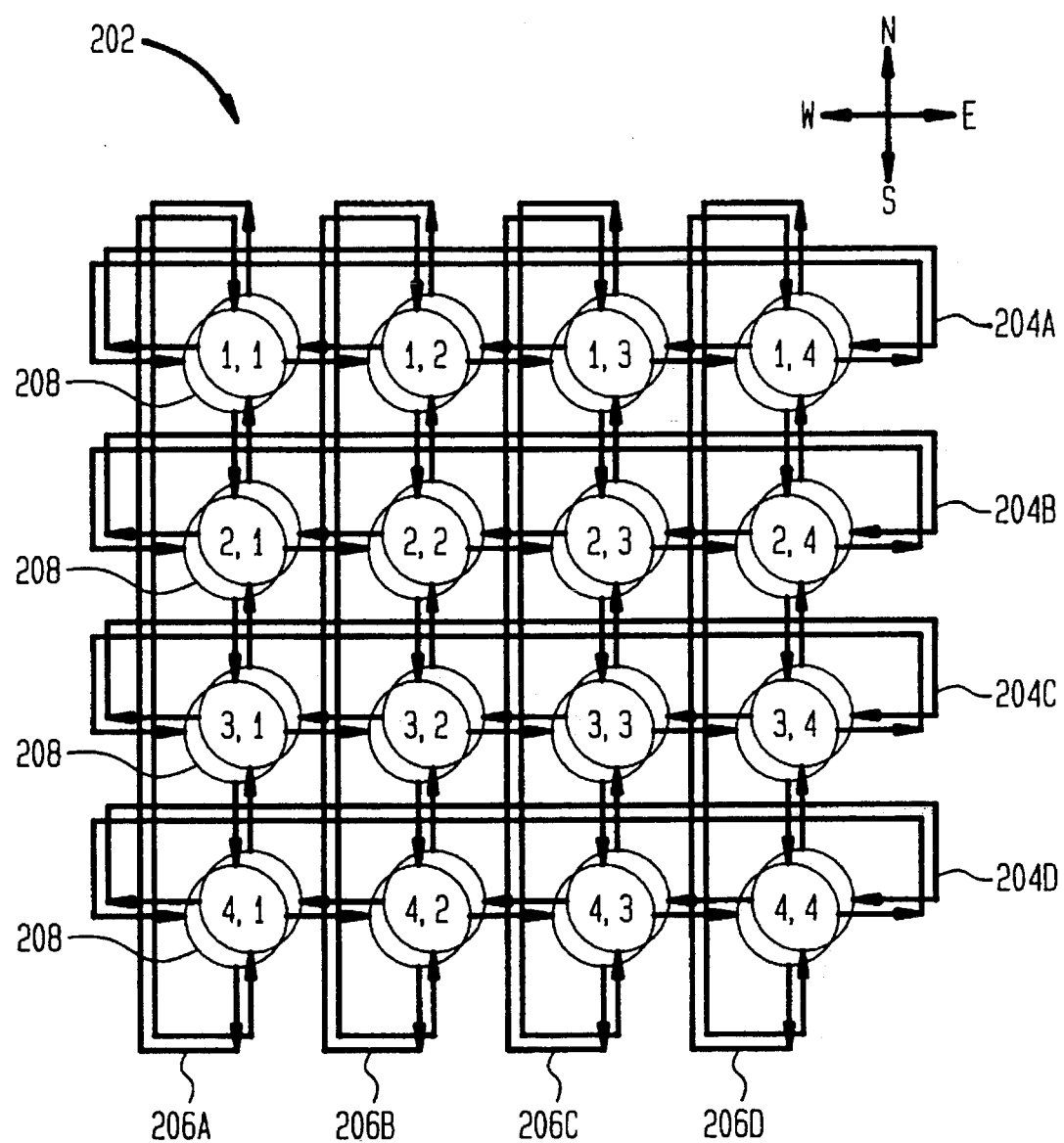
FIG. 2 illustrates a bidirectional mesh network according to a preferred embodiment of the present invention.

FIG. 2 illustrates an M×N bi-MSN 202 according to an embodiment of the present invention. In the particular embodiment of FIG. 2, both M and N are equal to four. However, M and N can be other values, and M does not have to be the same as N.

The bi-MSN 202 shown in FIG. 2 has sixteen nodes 208, where each node 208 is individually identified by its (row, column). The nodes 208 in the bi-MSN 202 are remotely programmable and reconfigurable, thus making the bi-MSN 202 an intelligent network.

The bi-MSN 202 is a mesh network that includes a set of horizontal parallel loops 204 and a set of vertical parallel loops 206. The horizontal loops 204 intersect and connect to the vertical loops 206 at the nodes 208. It should be understood that the terms horizontal and vertical are used herein for illustrative purposes, and they denote the preferred embodiment. The loops 204 and 206, which intersect one another, may be offset from one another by an angle other than 90 degrees. Also, the loops 204 need not be precisely parallel to each other. Similarly, the loops 206 need not be precisely parallel to each other.

Each node 208 includes four input ports, called the North input port, the South input port, the East input port, and the West input port. Similarly, each node 208 includes four output ports, called the North output port, the South output port, the East output port, and the West output port. The names of these input and output ports identify the links to which they are connected. Consider, for example, node (2,1). Its North input and output ports are connected to the link that resides directly to the south of node (1,1) (this link connects node (2,1) to node (1,1)). Similarly, its West input and output ports are connected to the link that resides directly to the east of node (2,4) (this link connects node (2,1) to node (2,4)).

Each node 208 is capable of receiving data packets from any of its input ports and transmitting data packets via any of its output ports. In the bi-MSN 202 of the present invention, the links which connect the nodes 208 to one another are bidirectional. Thus, each node 108 is capable of transporting data packets from a horizontal loop 104 to a vertical loop 106 in any direction, and vice versa. Consider the example where node (2,3) wishes to transmit a data packet to node (2,2). Since links are bidirectional in the bi-MSN, this data transfer takes place over a single link (i.e., node (2,3) transmits the packet via its West output port, and node (2,2) receives the packet via its East input port).

The bi-MSN 202 has distributed control. Specifically, each node 208 in the bi-MSN 202 makes autonomous decisions on how a packet should be routed (i.e., the routability of a packet). Each node 208 autonomously performs other functions, as described below.

2. Features and Characteristics of the Bidirectional Mesh Network

Communication features and performance characteristics of the bi-MSN 202 are discussed in the following sections.

2.1 Network Efficiency

In the following sections, packet deliverability, network propagation delay, network congestion, and flow control are discussed.

2.1.1 Packet Deliverability in the bi-MSN

This section considers a data packet's deliverability from the standpoint of different available routes in the bi-MSN of the present invention. For comparison purposes, first consider an N×N Manhattan Network. The total number of possible routes per channel without visiting the same node twice between a source node and a destination node in this Manhattan Network is approximately $N!(N-1)$.

Now consider an N×N bi-MSN. Because of the bidirectional nature of the bi-MSN, the number of possible routes increases more rapidly as N increases (as compared to the Manhattan Network). For example, for a 2×2 bi-MSN the number of possible routes is eight, for a 3×3 bi-MSN the number of possible routes is estimated to be 176, and for a 4×4 bi-MSN the number of possible routes is estimated to be 1592.

Figure 3:
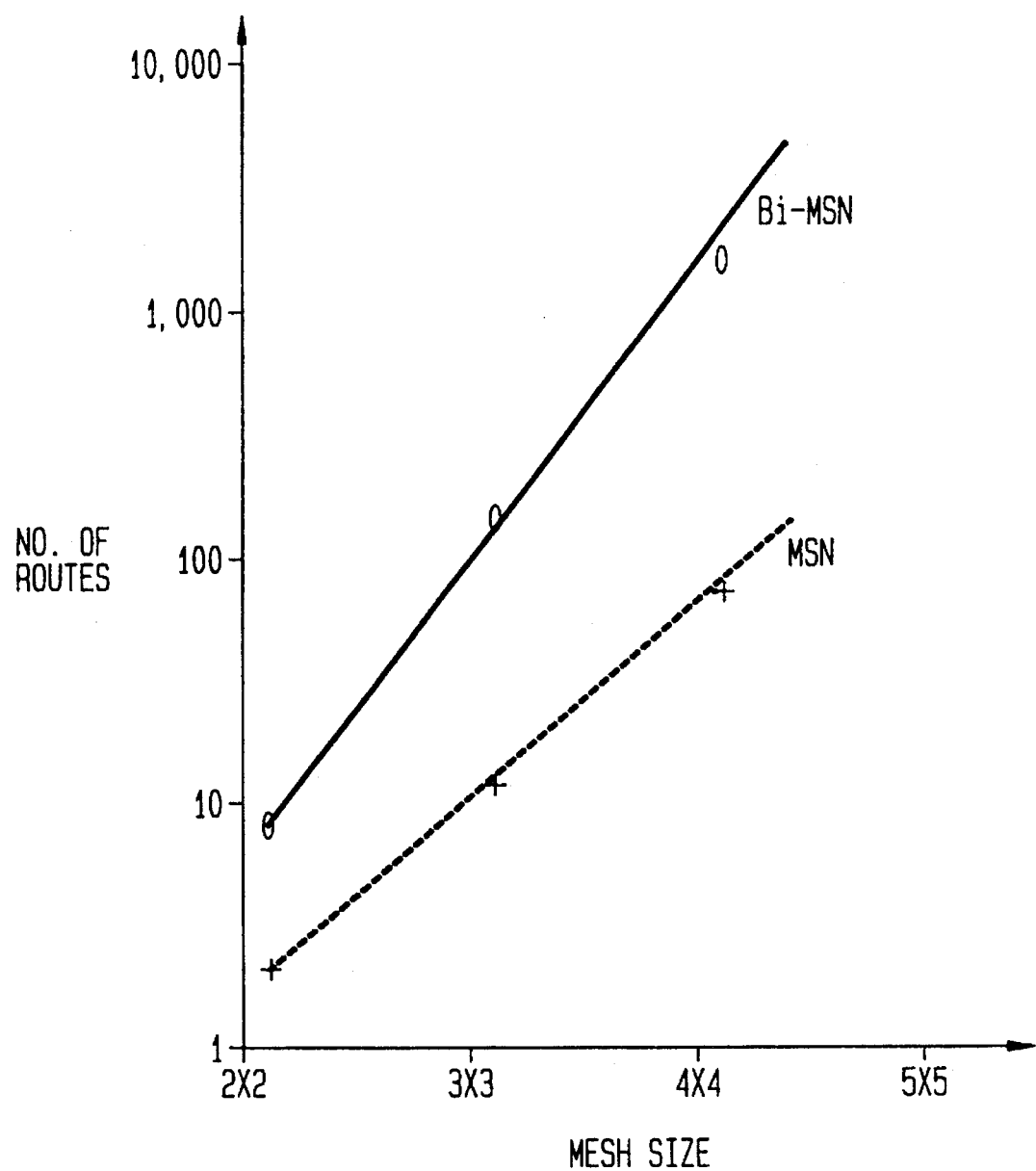
FIG. 3 is used to describe the deliverability of the bidirectional mesh network.

FIG. 3 compares the routability of the bi-MSN with the routability of the Manhattan Network (denoted "MSN" in FIG. 3). Note that the vertical axis is logarithmic. Thus, as the number of nodes in the bi-MSN increases, the deliverability of the bi-MSN increases rapidly in an exponential fashion. Some of these routes may seem convoluted and under normal circumstances they may not be optimal. However, in a large network where some nodes are faulty, these complicated routes may play a significant role in packet deliverability.

2.1.2 End-to-end Propagation Delay

Propagation delay in the bi-MSN depends on how many nodes are in the selected route, how many time slots are available per link (if time division multiple access, TDMA, is used) and per different frequency band (if frequency division multiple access, FDMA, or coded division multiple access, CDMA, is used), and also how many transfers from one loop to another loop (i.e., from a horizontal loop to a vertical loop, and vice versa) take place in the overall path. In order to minimize delay, and as discussed in greater detail below, the present invention selects an optimum route (if one is available) where a packet moves only once from a horizontal loop to a vertical loop, or vice versa, and with the least amount of nodes in the loops (this is assuming that the source and destination nodes are not in the same loop).

2.1.3 Network Congestion and How Control

Network congestion and flow control depend on the channel capacity of the links in the bi-MSN (a link is a communication element that connects two nodes in the bi-MSN). To determine the channel capacity of the links in the bi-MSN, the following network parameters must be known: the number of channels per node, n (it is assumed that each node acts as a hub or a server), the number of nodes per loop, N, and the percentage of channel blocking allowed. Assuming only one loop in the bi-MSN (the most basic network) with N nodes, each node with n channels, and 0% blocking allowed, then the inter-node link channel capacity is $n \times N/2 + I_{Net}$, where $I_{Net}$ is a small number of additional channels that are required for inter-network parameter communication. For two parallel loops A and B with the same number of nodes each, and assuming that 50% of the traffic passes from each node of loop A to nodes of loop B, in addition to traffic on loop B, then the worst case channel capacity in loop B is $3n/2 \times N/2 + I_{Net}$. Expressions for different numbers of loops in the network, and under different assumptions, will be apparent to persons skilled in the relevant art based on the above.

2.2 Fault Tolerance

The bi-MSN of the present invention is fault tolerant and exhibits excellent network survivability characteristics with respect to single, multiple, and cluster node failures. Its ability to survive node failures is enhanced by its superior network routability abilities, which are the result of its bidirectional nature. When one or more clusters of nodes in the bi-MSN fail, the bi-MSN is able to avoid affected areas and establish communication between two or more nodes via paths containing unaffected nodes.

For example, consider the bi-MSN 202 shown in FIG. 2. Under fault conditions, where one or more links are down and/or one or more nodes 208 are inoperable, an alternate route which bypasses the "trouble" area is selected. Assume, for example, that node (2,3) is faulty. For any given source node and destination node, a number of routes that do not involve node (2,3) are available, such that connectivity between nodes is not adversely affected by the faulty node (2,3). Suppose that a node fails after a path (called the original path) has been established. In this case, an alternate path is chosen by a node (in the original path) that is physically closer to the failed node (this is described in greater detail below). Hence, the bi-MSN, in addition to fault avoidance, exhibits network self-healing characteristics.

2.3 Disaster Avoidance

The bi-MSN of the present invention exhibits excellent disaster avoidance properties. Consider the case where one or more clusters of nodes become inoperable. In this case, the bi-MSN bypasses the affected areas and establishes communication using the remaining healthy network (assuming that sufficient connectivity still exists).

3. Bidirectional Mesh Network

The bidirectional mesh network (bi-MSN) of the present invention shall now be discussed in greater detail. During this discussion, reference shall be made to the bi-MSN 202 of FIG. 2.

3.1 Communication Links

As discussed above, the bi-MSN 202 includes a number of nodes 208 which are connected to one another by communication links. A communication link is a communication element that connects two adjacent nodes 208 (either horizontally or vertically). The communication links can be implemented using any well known transmission media, such as optical fiber, coaxial cable, twisted pair wire, wireless, etc. Transmission media that is developed in the future can also be used. Which transmission media to use is implementation dependent and depends on a number of factors, such as transmission technique used (TDMA, FDMA, CDMA, etc.), channel capacity, transmission speed, inter-node distance, etc.

If wireless is used, then frequencies, access methods, and protocols must conform to the frequencies allocated for terrestrial communication with standard access techniques such as TDMA, FDMA, CDMA. This is also true for coaxial cable, except here more flexibility exists due to the type of the medium. If fiber is used, then high bit rates conforming to a standard such as SONET (synchronous optical network) are used.

3.2 Nodes

Figure 4:
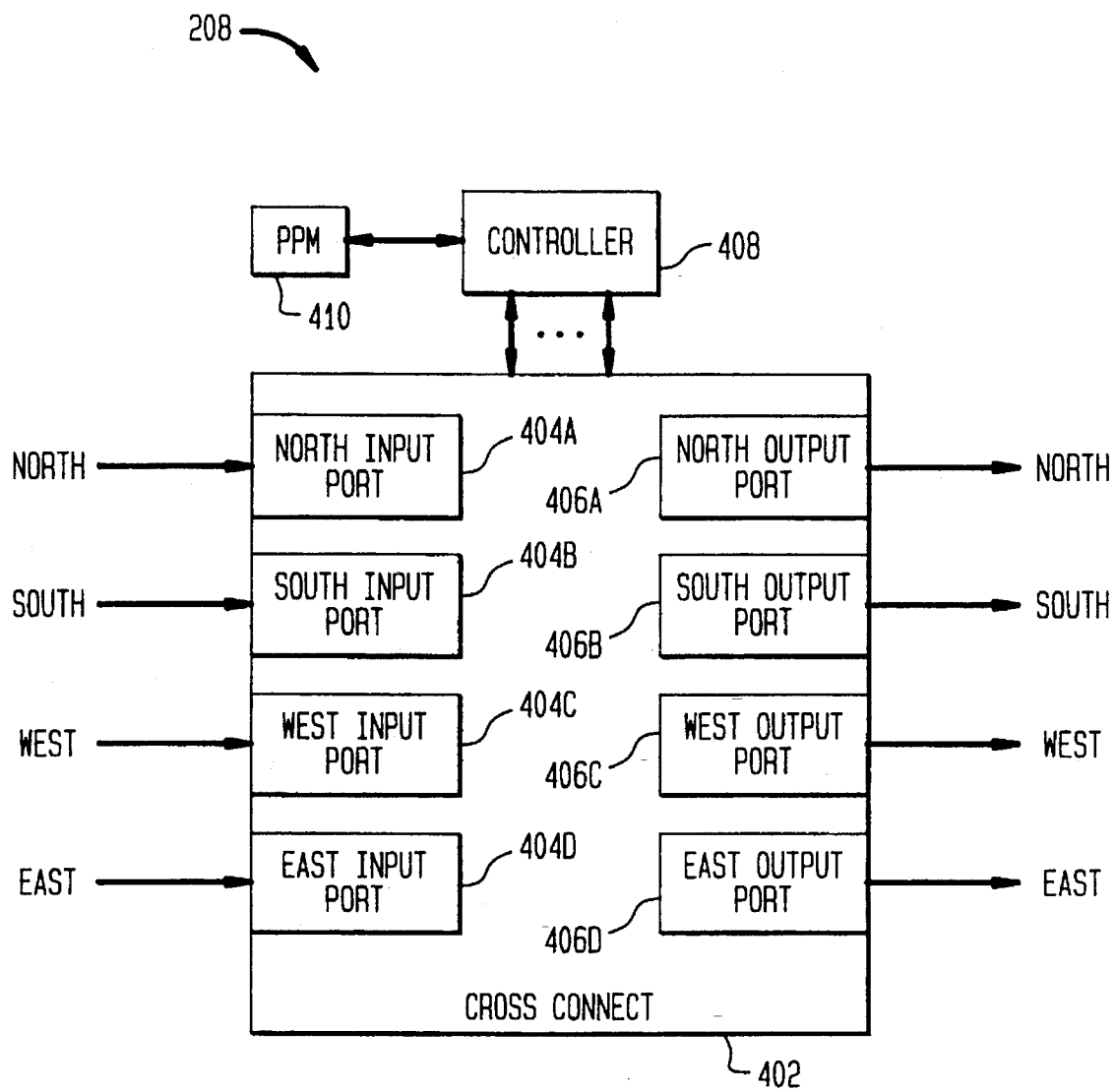
FIG. 4 is a block diagram of a node that forms part of the bidirectional mesh network.

FIG. 4 is a block diagram of a node 208. Each node 208 includes a cross connect 402 that represents a 4 input by 4 output space-time communication switch. Packets are preferably time division multiplexed (TDM) on each input and output of the cross connect 402 according to some well known packet transmission standard, such as the well known Asynchronous Transfer Mode (ATM) and SONET standards.

The cross connect 402 includes a North input port 404A, a South input port 404B, a West input port 404C, and an East input port 404D. The cross connect 402 also has a North output port 406A, a South output port 406B, a West output port 406C, and an East output port 406D. As discussed above, the names of these input and output ports 404, 406 identify the links to which they are connected.

The cross connect 402 is capable of connecting any of the input ports 404 to any of the output ports 406. For example, the cross connect 402 can connect the West input port 404C to the West output port 406C. Thus, the present invention provides a loop-back network capability for node and network path testing purposes.

The cross connect 402 is controlled by a controller 408, which preferably represents a central processing unit (CPU) operating according to computer software. Alternatively, the controller 408 can be implemented in hardware, using hardware state machines, for example. The controller 408 controls all functions of the node 208. These functions are described below. In performing these functions, the controller 408 may refer to data stored in a performance parameter map (PPM), which is preferably a table stored in memory, such as random access memory (RAM).

Figure 5:
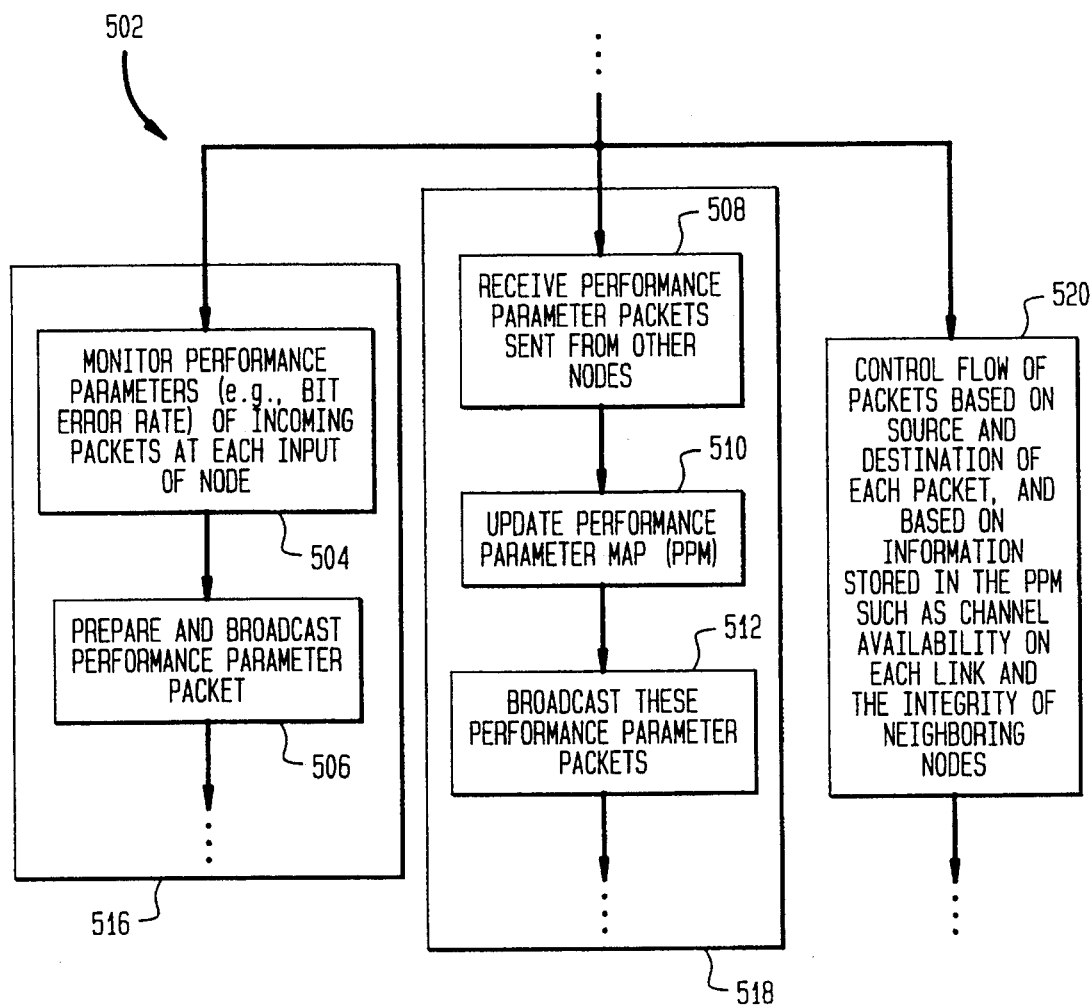
FIG. 5 is a functional diagram of the node of FIG. 4.

The functions performance by the node 208 as dictated by the controller 408 shall now be described with reference to a functional block diagram 502 shown in FIG. 5. The node 208 performs three primary functions: self diagnostics 516, PPM updating 518, and packet routing 520. These functions 516, 518, and 520 may be performed in parallel with one another (as indicated in FIG. 5), but may also be performed serially, or independently with respect to each other.

The self diagnostics function 516 is periodically performed. As indicated by step 504, the self diagnostics function 516 involves monitoring the performance parameters of the input nodes 404 as packets arrive at the input nodes 404. Monitoring performance parameters is a well known operation. Such performance parameters include packet error rate, congestion parameters, link and node integrity, delay parameters, etc. These performance parameters represent a measure of the communication integrity of each input node 404 (and the communication circuitry associated with each input node 404), and also of the channels of the communication links to which the input nodes 404 are connected. As indicated in step 506, the node 208 prepares a packet containing these performance parameters and also the identifier (such as the address) of the node 208. The manner in which this packet is prepared will be apparent to persons skilled in the relevant art. The node 208 then broadcasts (i.e., sends via all of its output ports) this performance parameter packet over the bi-MSN 202 to the other nodes.

The PPM updating function 518 is performed whenever the node 208 receives a performance parameter packet from another node. This is represented by step 508, where the node 208 receives a performance parameter packet from another node.

In step 510, the node 208 uses the information contained in the performance parameter packet to update its performance parameter map 410. The performance parameter map 410 contains an entry for each node in the bi-MSN 202. These entries contain performance parameter information for their respective nodes. Thus, during step 510, the node 208 uses the information contained in the performance parameter packet to update the entry in the PPM 410 corresponding to the node which originated (i.e., "sourced") the performance parameter packet.

By reference to the PPM 410, it is possible to identify working and non-working nodes, nodes which have input port problems, nodes which have output port problems (this can be determined by referencing performance parameter information associated with nodes that are downstream from the node in question), working and non-working links (this can be determined by referencing performance parameter information associated with nodes that are connected to the link in question), etc. The use of the PPM 410 is discussed further below.

In step 512, the node 208 broadcasts the received performance parameter packet to the other nodes in the bi-MSN 202. In this manner, performance parameter packets are eventually received by all nodes in the bi-MSN 202.

The packet routing function 520 (also called the flow control function) is performed whenever the node 208 receives a data packet. While performing the packet routing function 520, the node 208 determines how to best route the received data packet based on the source and destination nodes of the packet, and the information contained in the PPM 410.

Figure 6:
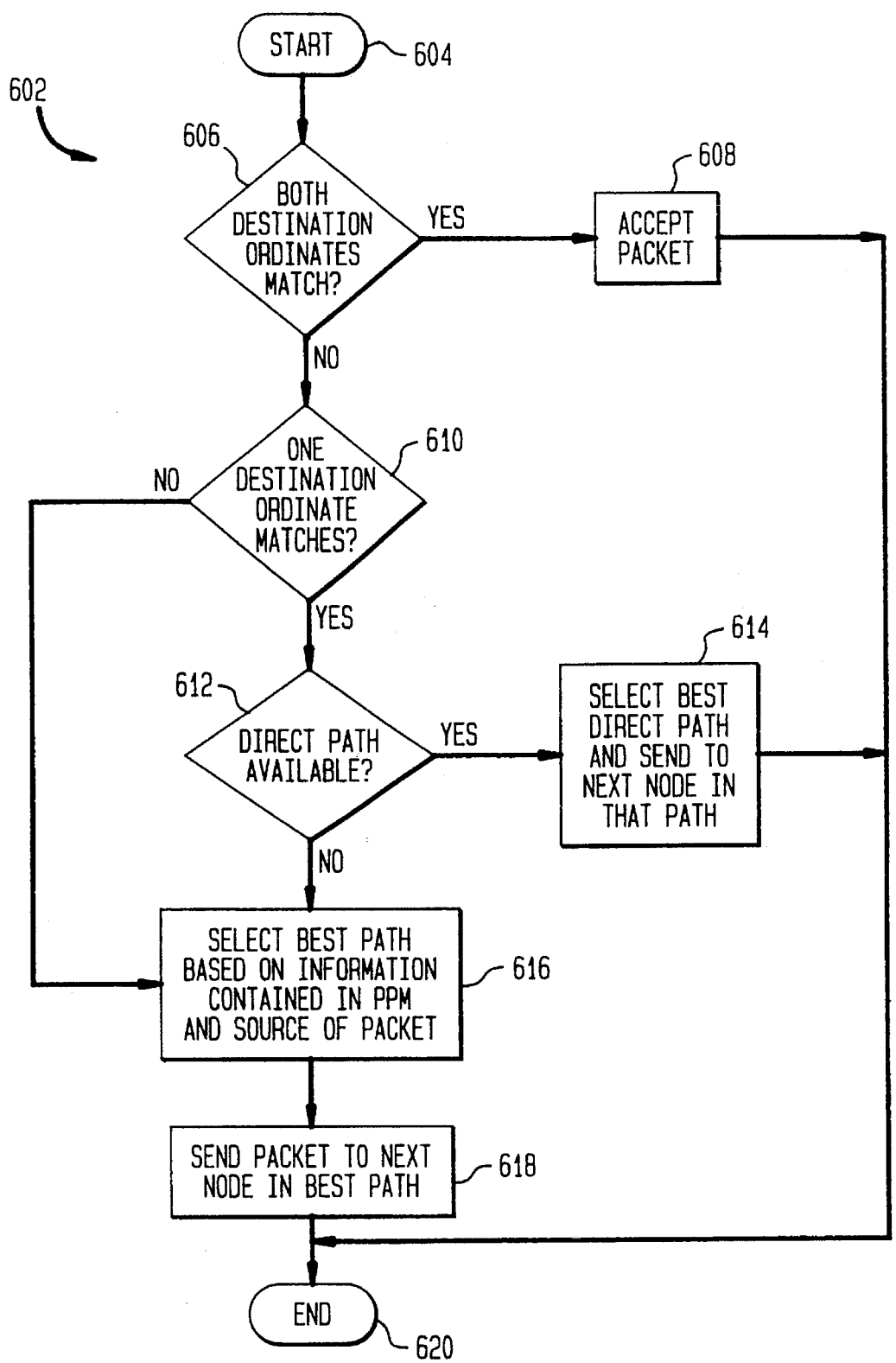
FIGS. 6 and 7 are flowcharts indicating the manner in which the each node routes packets through the bidirectional mesh network.

The manner in which the node 208 performs the packet routing function 520 shall now be explained in greater detail with reference to a flowchart 602 shown in FIG. 6. Flowchart 602 begins with step 604, where control immediately passes to step 606.

In step 606, the node 208 determines whether both ordinates of the packet's destination address match the two ordinates of its own address (in other words, the node 208 determines whether it is the destination of the packet). The packet's destination address is contained in the packet itself. Thus, in this step, the node 208 reads the packet for the destination address, which is expressed as (row,column), where row and column are ordinates of the destination address. The node 208 compares the destination address to its own address, and determines whether the row and column ordinates of the destination address match the row and column ordinates of its own address. If these ordinates match, then the node 208 concludes that it is the destination of the packet. Consequently, the node 208 accepts the packet (step 608; flowchart 602 is complete after processing step 608, as indicated by step 620). Otherwise, the node 208 performs step 610.

In step 610, the node 208 determines whether one of the ordinates of the packet's destination address matches one of the ordinates of its own address. If a match is found, then step 612 is performed. Otherwise, step 616 is performed. For example, assume that node (2,3) is processing step 610 for a packet having a destination address of (4,3). In this case, the column ordinates match, so the node (2,3) would perform step 612. Assume, instead, that the packet's destination address was (4,4). In this case, there is no match, so step 616 would be performed (described below).

In step 612, the node 208 determines whether a direct path to the destination node is available. Since one of the ordinates of the packet's destination address matches one of the ordinates of the node 208's address, two paths are guaranteed to exist; however, one or both of these paths may not be available due to a failure in an intervening node and/or link. The node 208 identifies failures in nodes and links by referring to the performance parameter information contained in its PPM 410.

For example, assume that node (1,3) is processing step 612 for a packet having a destination address of (4,3). Two direct paths exist from node (1,3) to node (4,3). The first path goes from node (1,3), to node (2,3), to node (3,3), to node (4,3). The second path goes from node (1,3) to node (4,3). One or both of these paths may not be available due to a failure in an intervening node and/or link. Assume that node (3,3) has failed. In this case, the first path is not available. Now assume that the link between nodes (1,3) and (4,3) is down. In this case, the second path would also not be available.

If, in step 612, the node 208 determines that a direct path to the destination node is available, then step 614 is performed. In step 614, the node 208 selects one of these direct paths and then sends the packet to the next node in the selected direct path. If only one direct path is available, then the node 208 selects that path. However, if both direct paths are available, then the node 208 selects the best path, where the best path is defined as the path which results in the shortest propagation delay from the original node (the source node) to the destination node. In this instance, the best path is the one having the least amount of nodes. In the above example where node (1,3) is processing step 612 for a packet having a destination address of (4,3), the best path is the one from node (1,3) to node (4,3).

Flowchart 602 is complete after processing step 614, as indicated by step 620.

If, in step 612, the node 208 determines that a direct path to the destination node is not available, then step 616 is performed. In step 616, the node 208 identifies and selects the best available path to the destination node. It is assumed in this discussion that there is at least one available path to the destination node.

If there is not a path available, then the action taken by the node 208 depends on the service type of the packet. If the packet is involved in a real time service (such as real time voice), then preferably the packet is dropped and the connection is dropped (the node 208 may send a message reporting this to the source node). If, instead, the packet is involved in a non-real time service (such as store and transfer data transmission), then the node 208 saves the packet in its queue and sends the packet later once a path becomes available (although if no path becomes available after a given amount of time, then the packet is dropped).

Figure 7:
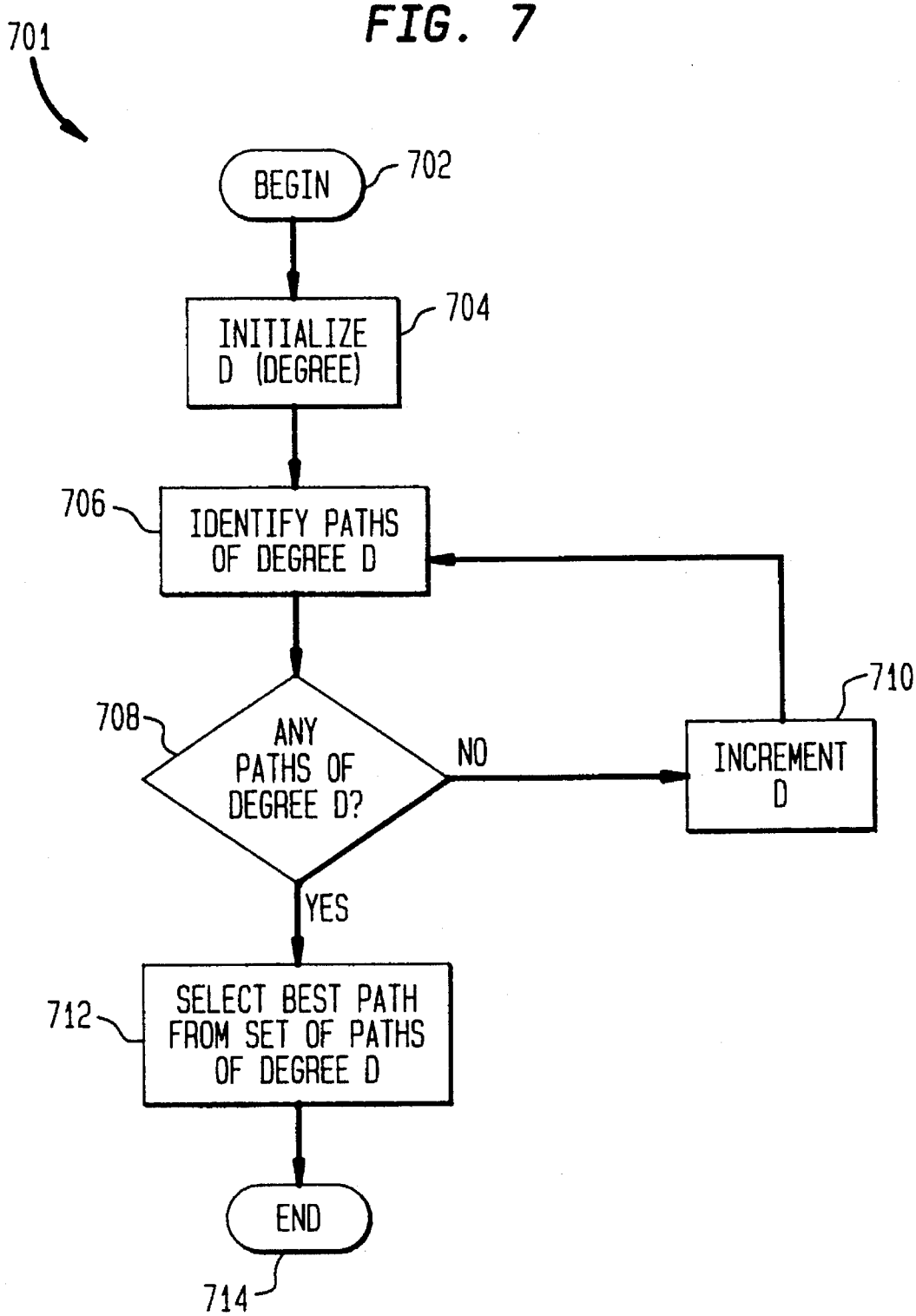

The manner in which the node 208 performs step 612 shall now be described in detail with reference to a flowchart 701 in FIG. 7. Flowchart 701 begins with step 702, where control immediately passes to step 704.

In step 704, the node 208 initializes a degree variable, d, to zero.

In step 706, the node 208 identifies all available paths of degree d to the destination node. A path is of degree 0 if it involves 0 inter-loop transfers. An inter-loop transfer is a transfer of a packet from a horizontal loop 204 to a vertical loop 206, or vice versa. For example, suppose node (1,1) originates a packet having a destination of node (1,3). There are two paths of degree 0, the first from node (1,1) to node (1,2) to node (1,3), and the second from node (1,1) to node (1,4) to node (1,3).

A path is of degree 1 if it involves 1 inter-loop transfer. For example, suppose node (1,1) originates a packet having a destination of node (4,4). There are a number of paths of degree 1, the first from node (1,1) to node (4,1) to node (4,4), the second from node (1,1) to node (1,4) to node (4,4), and the third from node (1,1) to node (2,1) to node (3,1) to node (4,1) to node (4,2) to node (4,3) to node (4,4). There are additional paths of degree 1, as will be apparent to persons skilled in the relevant art.

The nature of paths of degrees higher than 1 will be apparent to persons skilled in the relevant art based on the above discussion.

Some processing time is involved with performing inter-loop transfers. Thus, to reduce propagation delays, it is desirable to select a path having the smallest number of inter-loop transfers possible. In other words, the present invention operates to select the lowest degree path possible to transfer the packet to the destination node (that is why d is initialized to zero in step 704).

Note that, in step 706, the node 208 identifies all available paths of degree d to the destination node. Thus, paths of degree d may exist, but they may not be available due to failures in nodes and/or links.

Also note that, in step 706, the node 208 considers the loop on which the packet was received when identifying the paths of degree d. For example, suppose that node (1,2) receives a packet from node (1,1) on loop 204A, and that this packet has a destination of node (4,4). With respect to node (1,2), paths of degree 1 include a path from node (1,2) to node (1,4) to node (4,4). The path from node (1,2) to node (4,2) to node (4,4) also appears, at first glance, to be a path of degree 1. However, this is in actuality a path of degree 2, since it involves two inter-loop transfers, one from horizontal loop 204A to vertical loop 206B at node (1,2), and a second from vertical loop 206B to horizontal loop 204D at node (4,2).

As indicated by decision step 708, if no paths of degree d are available, then step 710 is performed. In step 710, d is incremented by one, and then control returns to step 706.

If, instead, one or more paths of degree d are determined to be available, then step 712 is performed. In step 712, the node 208 selects one of these available paths of degree d. If only one degree d path is available, then the node 208 selects that path. However, if more than one degree d paths are available, then the node 208 selects the best path, where the best path is defined as the path with results in the shortest propagation delay from the original node (the source node) to the destination node. In this instance, the best path is the one having the least amount of nodes.

Flowchart 701 is complete after processing step 712, as indicated by step 714.

Referring again to FIG. 6, in step 618 the node 208 sends the packet to the next node (i.e, the adjacent node) in the path selected in step 616. Operation of flowchart 602 is complete after step 618, as indicated by step 620.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A communication network, comprising:

a first communication loop comprising a plurality of nodes interconnected to one another by bidirectional communication links; and a second communication loop comprising a plurality of nodes interconnected to one another by bidirectional communication links, said second communication loop connected to said first communication loop at a common node which is common to both said first and second communication loops;

said common node comprising a switch to transfer packets from said first communication loop to said second communication loop, and vice versa, as a function of destination addresses contained in said packets, wherein each of said nodes comprises, a plurality of input ports connected to communication links which are also connected to nodes in said first and second communication loops which are adjacent to said each node;

means for monitoring performance parameters of said input ports;

means for generating a performance parameter packet containing an identifier of said each node and said performance parameters; and means for broadcasting said performance parameter packet to all other nodes in said first and second communication loops.

2. The communication network of claim 1, wherein said first communication loop substantially forms a right angle with said second communication loop.

3. A communication network, comprising:

a first communication loop comprising a plurality of nodes interconnected to one another by bidirectional communication links; and a second communication loop comprising a plurality of nodes interconnected to one another by bidirectional communication links, said second communication loop connected to said first communication loop at a common node which is common to both said first and second communication loops;

said common node comprising a switch to transfer packets from said first communication loop to said second communication loop and vice versa, as a function of destination addresses contained in said packets, wherein each of said nodes comprises, means for receiving a performance parameter packet from another node in said communication network, said performance parameter packet comprising performance parameters pertaining to said another node, said performance parameters indicating a communication integrity of said another node and of communication links connected to said another node; and means for updating an entry in a performance parameter map corresponding to said another node in accordance with said performance parameters contained in said performance parameter packet.

4. The communication network of claim 3, wherein said each node also comprises:

means for receiving a data packet;

means for selecting a path in said communication network on which to route said data packet to its destination in accordance with performance parameter information contained in said performance parameter map; and means for sending said data packet to a next node in said selected path.

5. A communication network, comprising:

a plurality of first communication loops each comprising a plurality of nodes interconnected to one another by bidirectional communication links; and a plurality of second communication loops each comprising a plurality of nodes interconnected to one another by bidirectional communication links;

each second communication loop connected to each first communication loop at a node which is common to both said each second communication loop and said each first communication loop;

said common node comprising a switch to transfer packets from said each first communication loop to said each second communication loop, and vice versa, as a function of destination addresses contained in said packets;

wherein each node in said first and second communication loops comprises, a plurality of input ports connected to communication links which are also connected to nodes in said first and second communication loops which are adjacent to said each node;

means for monitoring performance parameters of said input ports;

means for generating a performance parameter packet containing an identifier of said each node and said performance parameters; and means for broadcasting said performance parameter packet to all other nodes in said first and second communication loops.

6. The communication network of claim 5, wherein said first communication loops are aligned substantially parallel to one another, and said second communication loops are aligned substantially parallel to one another.

7. The communication network of claim 5, wherein said first communication loops are aligned substantially perpendicular to said second communication loops.

8. A communication network, comprising:

a plurality of first communication loops each comprising a plurality of nodes interconnected to one another by bidirectional communication links; and a plurality of second communication loops each comprising a plurality of nodes interconnected to one another by bidirectional communication links;

each second communication loop connected to each first communication loop at a node which is common to both said each second communication loop and said each first communication loop;

said common node comprising a switch to transfer packets from said each first communication loop to said each second communication loop, and vice versa, as a function of destination addresses contained in said packets;

wherein each of said nodes comprises, means for receiving a performance parameter packet from another node in said communication network, said performance parameter packet comprising performance parameters pertaining to said another node, said performance parameters indicating a communication integrity of said another node and of communication links connected to said another node; and means for updating an entry in a performance parameter map corresponding to said another node in accordance with said performance parameters contained in said performance parameter packet.

9. The communication network of claim 8, wherein said each node also comprises:

means for receiving a data packet;

path selecting means for selecting a path in said communication network on which to route said data packet to its destination in accordance with performance parameter information contained in said performance parameter map; and means for sending said data packet to a next node in said selected path.

10. The communication network of claim 9, wherein said path selecting means comprises:

means for determining whether a destination address of said packet matches an address of said each node;

means for accepting said packet if said packet destination address matches said address said each node;

means for determining, if said packet was not accepted, whether one ordinate of said packet destination address matches a corresponding ordinate of said address of said each node;

means for determining whether a direct path is available from said each node to a destination node of said packet in accordance with performance parameter information contained in said performance parameter map if one ordinate of said packet destination address a corresponding ordinate of said address of said each node;

direct path selecting means for selecting an available direct path if one is available; and for sending said packet to a next node in said selected direct path.

11. The Communication network of claim 10, wherein said path selecting means further comprises:

for selecting a non-direct path from said each node to said destination node in accordance with performance parameter information contained in said performance parameter map if a direct path is not available; and for sending said packet to a next node in said selected non-direct path.

12. In a communication network comprising a plurality of first communication loops each comprising a plurality of nodes interconnected to one another by bidirectional communication links, and a plurality of second communication loops each comprising a plurality of nodes interconnected to one another by bidirectional communication links, each second communication loop connected to each first communication loop at a node which is common to both said each second communication loop and said each first communication loop, a method in said common node for routing a packet in said communication network, comprising the steps of:

(1) determining whether a destination address of said packet matches an address of said common node;

(2) accepting said packet in said common node if said packet destination address matches said common node address;

(3) determining, if said packet was not accepted, whether one ordinate of said packet destination address matches a corresponding ordinate of said common node address;

(4) determining whether a direct path is available from said common node to a destination node of said packet in accordance with performance parameter information contained in a performance parameter map if one ordinate of said packet destination address matches a corresponding ordinate of said common node address;

(5) selecting an available direct path if one is available; and (6) sending said packet to a next node in said selected direct path.

13. The method of claim 12, wherein step (5) comprises the step of:

selecting a direct path containing the least amount of nodes if multiple direct paths are available.

14. The method of claim 12, further comprising the steps of:

(7) means for selecting a non-direct path from said common node to said destination node in accordance with performance parameter information contained in said performance parameter map if a direct path is not available; and (8) sending said packet to a next node in said selected non-direct path.

15. The method of claim 14, wherein step (7) comprises the steps of:

(a) identifying all paths of degree d from said common node to said destination node;

(b) determining whether any of said identified paths of degree d are available in accordance with performance parameter information contained in said performance parameter map; and (c) if one or more of said paths of degree d are available, then selecting one of said available paths of degree d.

16. The method of claim 15, wherein step (c) comprises the step of:

selecting an available path of degree d containing the least amount of nodes if multiple paths of degree d are available.

17. The method of claim 15, wherein step (7) further comprises the step of:

(d) if no paths of degree d are available, then incrementing d by one and repeating steps (a)–(c).

* * * * *